United States Patent [19]

Glass

[11] 4,243,942
[45] Jan. 6, 1981

[54] FULLY RELAYED REGENERATIVE AMPLIFIER

[75] Inventor: Alexander J. Glass, Berkeley, Calif.

[73] Assignee: The United States of America as represented by the United States Department of Energy, Washington, D.C.

[21] Appl. No.: 868,642

[22] Filed: Jan. 11, 1978

[51] Int. Cl.³ .................... H01S 3/10; H01S 3/05
[52] U.S. Cl. .................... 330/4.3; 331/94. 5 C; 331/94.5 T
[58] Field of Search ............ 331/94.5 C, 94.5 Q, 331/94.5 T; 330/4.3

[56] References Cited

U.S. PATENT DOCUMENTS

| | | | |
|---|---|---|---|
| 3,243,724 | 3/1966 | Vuylsteke | 331/94.5 Q |
| 3,247,467 | 4/1966 | Geusic et al. | 331/94.5 C |
| 3,258,717 | 6/1966 | Katzman | 331/94.5 C |
| 3,597,695 | 8/1971 | Swain et al. | 330/4.3 |
| 3,668,536 | 6/1972 | Michon | 330/4.3 |
| 3,928,811 | 12/1975 | Hughes | 330/4.3 |
| 3,928,818 | 12/1975 | White | 331/94.5 T |

FOREIGN PATENT DOCUMENTS

7004185  2/1970  France ..................... 330/4.3

OTHER PUBLICATIONS

Simmons et al., "Argus Laser System; Performance Summary", 5/19/77, pp. 1-11, UCRL-79546, Lawrence Livermore Laboratory.
Belanger et al., "Gigawatt Peak Power Pulse . . . Threshold (RAAT)", 3/15/76, pp. 720-727, Canadian Journal of Physics, vol. 54, #6.
Hunt et al., "The Use of Multiple Spatial Filters as a Relay Line . . . ", 9/9/76, pp. 1-7, Preprint UCRL-78653.
Hunt et al., "Improved Performance of Fusion Lasers . . . ", 4/77, pp. 779-782, Applied Optics, vol. 16, #4, G-250.
Glaze, "High Energy Glass Lasers", 1975, pp. 45-54, SPIE, vol. 69, G-222.
Boranova et al., "Diffractions and Self Focusing . . . ", 5/75, pp. 1362-1366, SSQE, vol. 4, #11.

*Primary Examiner*—Nelson Moskowitz
*Attorney, Agent, or Firm*—James E. Denny; Roger S. Gaither; P. Martin Simpson, Jr.

[57] ABSTRACT

A regenerative laser apparatus and method using the optical relay concept to maintain high fill factors, to suppress diffraction effects, and to minimize phase distortions in a regenerative amplifier.

21 Claims, 10 Drawing Figures

FULLY RELAYED REGENERATIVE AMPLIFIER

BACKGROUND OF THE INVENTION

The invention described herein was made at Lawrence Livermore Laboratory in the course of, or under, Contract W-7405-ENG-48 between the U.S. Department of Energy (formerly Energy Research and Development Administration) and the University of California.

The invention pertains to regenerative laser amplifiers. More particularly, this invention relates to the application of the optical relay concept to regenerative amplifiers.

Small aperture regenerative amplifiers are old in the art. When a laser beam passes through an amplifier more than once, it extracts more of the energy stored in the amplifier than is extracted in one pass. U.S. Pat. No. 3,243,724 to Vuylsteke teaches and claims a method for producing very short, high intensity laser pulses, using regenerative amplification techniques. A flashlamp produces a population inversion in a cavity with the end reflectivity turned off. After about 80% of the population is excited to a metastable state, the end reflectivity is turned on and radiant energy within the cavity builds up by both spontaneous and stimulated emission, by extracting energy from the inverted excited state population. After the radiant energy density has increased to a peak, end reflectivity is again turned off and the radiation is quickly extracted from the cavity through a shunt path. Vuylsteke appears to conptemplate only a moderately long lifetime upper state, such as present in a ruby rod, for example, and his excitation source is a flashlamp which pumps only once in a cycle.

U.S. Pat. No. 3,597,695 to Swain et al. teaches and claims use of one or many passes of a laser pulse through a single amplifier placed inside a cavity for laser amplification. The (polarized) laser pulse is injected into the cavity, containing the amplifier and two mirrors spaced therefrom, allowed to pass one or more times through the amplifier, and switched out of the cavity by polarity control using a Pockels cell. The amplifier is excited only once. The energy output of the amplifier is limited by damage to the weakest optical component, the Pockels cell; and Swain et al. appears to contemplate only the use of relatively long lifetime gain media, such as $Nd^{3+}$: glass, where multiple excitation of the gain medium is unnecessary. Multiple excitation of the gain medium and utilization of short lifetime species is not discussed. Switching techniques other than the Pockels cell are not described.

U.S. Pat. No. 3,646,467 to Buczek et al. teaches and claims the use of a ring interferometer acting as a regenerative amplifier and being driven by a low power oscillator, with the amplifier gain just below the threshold for oscillation. The gain medium of this traveling wave regenerative amplifier is driven in only one direction around the ring and requires slaving the resonant frequency of the ring interferometer to the oscillator, which should have a spectrally pure output.

U.S. Pat. No. 3,414,835 to Miller teaches and claims the use of a closed path optical system to cause an injected laser pulse to be multiply reflected from two or more surfaces and to be periodically focused and refocused so that the light beam passes through a transparent workpiece or sample many times. No provision is made for rapidly and repetitively amplifying the laser pulse each time it traverses the optical system of for injecting the target into the cavity.

U.S. Pat. No. 3,668,536 to Michon teaches the use of a single amplifier with fully reflective means spaced from the ends of the amplifier, to reflect light back into the amplifier and cause said amplifier to respond as if it were several amplifier states in series. Pulse switchout means is also provided. Michon is forced to shorten his pulse initially, to avoid overlap between counterpropagating portions of the same pulse; and Michon does not indicate how his amplifier stages are to be rapidly and repetitively pumped (evidently, at transit times $\gtrsim 3 \times 10^{-9}$ sec.).

U.S. Pat. No. 3,968,456 to Welch teaches the use of a regenerative amplifier in conjunction with a remotely located source of light or means of reflection. Welch terminates one end of the regenerative amplifier with a semitransparent plane mirror. If a light source with the same frequency as the regenerative amplifier laser light, or a retro-reflecting member, enters into the field of view of the regenerative amplifier, the light circulating in the amplifier is sharply increased, and the presence of the remote object can be detected. Since the efficiency of generation is of no concern to Welch and since high power outputs are not anticipated, suppression of diffraction effects and maintenance of a high fill factor are not discussed in the Welch patent. No specification of the dimensions of the regenerative amplifier resonator is given, and Welch gives no consideration to the use of an optical relay.

The optical relay concept is a relatively new concept and is disclosed in the U.S. patent application Ser. No. 830,972 (now U.S. Pat. No. 4,158,176), filed Sept. 6, 1977, by Hunt el al., and is assigned to the assignee of this application. The Hunt et al., application discloses the concept of an optical relay and applies the optical relay idea to a cascaded chain of high energy, laser amplifiers. Since the in-phase reimaging of apertures reduces diffraction effects at the edge of a laser beam, the fill factor, and thus stored energy utilization, is increased in Hunt's contemplated single aperture laser amplifiers. Hunt et al., does not in any way mention a regenerative amplifier configuration and does not contemplate the reduction of diffraction effects of segmented optical elements within a laser beam. The optical relay concept was published in UCRL-78653 after Sept. 10, 1976.

Excepting the Hunt et al. patent application and publication, no mention is made of an optical relay and no attempt is made in the above art to control the growth of nonlinear phase distortion and beam intensity variation due to diffraction. Diffraction limits the achievable fill factor (the ratio of illuminated area to total area of an aperture), thus reducing the stored energy utilization of the laser medium. In lasers based on solid or liquid transparent dielectric laser media, such as optical glass doped with neodymium, much material lies in the optical path of the laser beam. This material has an index refraction which is intensity dependent. Thus, a long optical path through optical components causes nonlinear phase distortion, that accumulates with the path length, especially for solid state laser media. Due to diffraction, this phase distortion leads to intensity distortion, known as self-focusing, which is deleterious to the operation of the laser system. Self-focusing can lead to the damage of optical components and to a loss of focusability of the laser beam. The applicant is not aware of any attempt in the prior art to apply the optical relay to regenerative amplifiers. Without the optical relaying of applicant's invention the use of segmented elements in high power systems would require further structures to be placed in the laser beam in order to prevent damage at the segment boundaries. The maintenance of a high fill factor in a high power, segmented element system is not possible without the optical relay.

SUMMARY OF THE INVENTION

The present invention provides a method and an apparatus for suppressing diffraction effects and phase distortions in a regenerative amplifier, particularly in regenerative amplifiers of large aperture, through the use of the imaging properties of an optical relay along a closed optical path formed by focusing means and reflective means being positioned and optically aligned by optical relay means, to produce, with amplifier means and switch means, a fully relayed regenerative amplifier.

One object of the present invention is to suppress the effects of diffraction, including self-focusing, in regenerative amplifiers through the use of the optical relay.

Another object of the present invention is to suppress the effects of diffraction, including self-focusing, in high energy regenerative amplifiers through the use of the optical relay.

Another object of the present invention is to suppress the effects of diffraction, including self-focusing, in large aperture regenerative amplifiers through the use of the optical relay.

Another object of the present invention is to suppress the effects of diffraction, including self-focusing, in large aperture, solid state, regenerative amplifiers through the use of the optical relay.

Another object of the present invention is to substantially increase the extracted energy for a given regenerative amplifier laser system by using the optical relaying concept.

Another object of the present invention is to provide efficient, large aperture regenerative lasers.

Other objects and advantages of the present invention will become clear from the following drawings and detailed description of the present invention.

DESCRIPTION OF PREFERRED EMBODIMENT

Regenerative amplifiers are an especially attractive design option for large aperture lasers. For the 20 cm aperture, single pass, cascade, solid state laser, 20-30% of the total cost of the laser system may be in the last amplification stage. Decreasing the number of large aperture amplifiers, and possibly amplifiers of smaller stages, significantly decreases the cost of a large aperture laser system. Multiple passes of a laser beam through one amplifier can produce a laser beam of similar power to the output of a single pass, laser chain. Also, multiple passing extracts a greater amount of the stored energy in the laser amplifier. Multiple passes of the laser beam through an amplifier is the essence of the regenerative amplifier.

Diffraction is a major limitation on extracting as great a fraction of the laser amplifier stored energy as possible. In high power laser systems in particular, unextracted energy represents a significant loss in energy, in capital cost, and in operating cost. Diffraction effects limit energy extraction through limiting the available aperture area from which the laser beam can extract energy. The ratio of the illuminated area to the total area of the aperture is called the fill factor, and can be expressed as the ratio of the average power density over the entire aperture to the peak power density. To obtain uniform and efficient extraction of the stored energy, the fill factor should be close to unity. Only with the extracted energy spread out over the entire aperture, is it possible to propagate the maximum total power and energy in the laser pulse consistent with optical damage restrictions, which limit the peak power density or energy density to a given maximum value.

Figure 1:
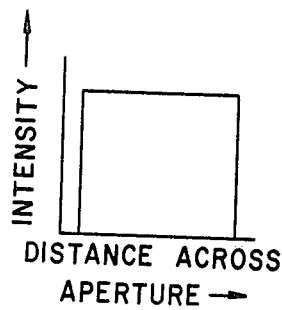
FIG. 1 is a graph of intensity versus distance over an aperture for an input laser beam of uniform cross-sectional intensity.
Figure 2:
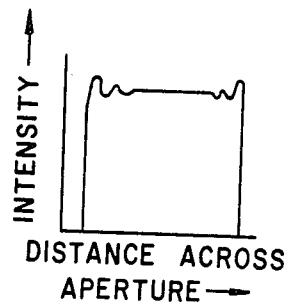
FIG. 2 is a graph of intensity versus distance over an aperture for the laser beam of FIG. 1 after it has propagated a finite distance.
Figure 3:
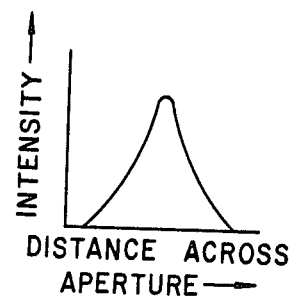
FIG. 3 is a graph of intensity versus distance over an aperture for an apodized input laser beam.

Diffraction effects take place at the edge of an aperture. Ideally, one would like to fill the aperture uniformly as is shown in the FIG. 1 graph of intensity versus distance across an aperture. However, FIG. 2 illustrates the diffraction ripples which arise at the edge of the FIG. 1 beam after propagation over a finite path length. Apodization prevents these diffraction ripples from occurring, but FIG. 3 illustrates that the smoothly varying intensity profile resulting from apodization greatly reduces the fill factor.

In addition, in large aperture systems, segmented optical components may be used. The segment boundaries in the laser beam can act just as the aperture boundaries do to produce diffraction ripples. Worse yet, the materials forming the interstitial boundaries are likely to be strongly absorbing at the laser wavelength to limit fluorescence amplification and parasitics; stray light from diffraction can damage these materials. More importantly, the use of shields to protect these interstitial boundary materials can lead to diffraction effects, causing severe modulation of the laser beam. Segmented optical components such as amplifiers and Pockels cells are disclosed in U.S. patent application Ser. No. 868,644 (now U.S. Pat. No. 4,191,928) by John Emmett filed on the same day as this application and assigned to the assignee of this application.

Nonlinear optics also presents a major problem for high power laser beams. At high intensity, the nonlinear index of refraction of materials becomes increasingly important. As diffraction ripples or phase distortions develop during the laser beam propagation, regions of the laser beam in cross section become more intense than the rest of the beam. These more intense, cross-sectional regions induce a greater nonlinear index of refraction, which tends to bend more of the laser light into the more intense regions. This self-enhancing process is called self-focusing and causes the breakup of a high-power laser beam into many regions of high intensity, with strong cross-sectional phase variations. The effects increase with amount of optical material traversed. One approach to limit self-focusing is to limit the optical path in which a laser beam must cross optical materials with relatively large nonlinear indices of refraction. One example is the use of a disc amplifier instead of a rod amplifier. Once the materials, laser wavelength, and optical path length are chosen in a high power laser, the intensity of the laser beam should be kept near the materials damage limits, which for solid state lasers is about 4–10 J/cm$^2$. At once, a problem arises in that some cross-sectional regions of the laser beam will be more intense than others due to diffraction effects and nonlinear index effects, both leading to self-focusing. This will be true whether the amplifier is single pass or regenerative.

One solution to self-focusing is the spatial filter. By focusing a laser beam between two focusing elements, spaced apart at the sum of their focal lengths, and by placing at the common focus an aperture of a diameter slightly larger than the calculated diameter of the laser beam at the common focus, the higher spatial frequencies in the laser beam are imaged on the opaque material outside the diameter of the aperture. This aperture is a spatial filter. It suppresses the effects of beam breakup and enables the designer to use a wider variety of optical materials. In large aperture lasers, the spatial filter pinhole typically satisfies $$\frac{r_o a}{\lambda f} \approx 7\text{-}10$$

where
- $r_o$ is the radius of the pinhole
- $a$ is the laser beam radius at input to the pinhole
- $\lambda$ is wavelength of the laser light
- $f$ is the focal length of the focusing element in the direction from which the laser light approached the pinhole.

Pinholes used on the ARGUS laser system at Lawrence Livermore Laboratory are in the range from 300 to 600 microns. For more information on self-focusing and the nonlinear index of refraction see Glaze, "High Energy Glass Lasers", Optical Engineering 15, 136 (1976). Also for noncircular apertures, a more general fourier transform analysis should be used. One example is that for a rectangular laser beam, the spatial filter aperture may best be in the form of a cross. The spatial filter suppresses laser beam filamentation for any aperture geometry.

The relatively new concept of the optical relay offers a method of reducing diffraction and phase distortion effects which lead to self-focusing. In optical relaying, a succession of telescopes reimages the beam as it propagates throughout the laser system. Although specific modes are reimaged in phase after a round trip of an optical resonator, only in the optical relay are all phases reproduced in a round trip. This apparent lack of distance traveled by the laser light is reflected in the ray matrix analysis for paraxial rays through the upper-right-hand matrix element being zero for the round trip. Thus in order to design an optical relay means, the focusing means and reflective means need to be positioned and aligned such that the upper right-hand matrix element is zero. It follows that an injected seed pulse can be optically relayed along consecutive amplification stages with minimal aberration and diffraction. This is true for a cascaded laser chain or a multipass laser with only one amplifier.

Figure 4:
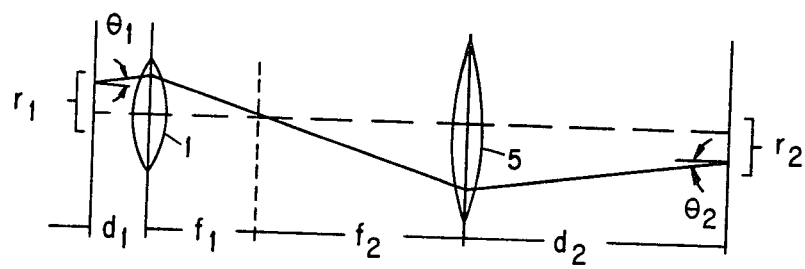
FIG. 4 is an example of an optical relay using lenses.

More quantitatively, FIG. 4 illustrates a simple optical relay system. The first lens 1 is a thin lens of focal length $f_1$, and the second lens 5 is a thin lens of focal length $f_2$. First lens 1 and second lens 5 are positioned along the same optical axis, indicated by the dotted line, and separated by a distance of $f_1+f_2$. Adopting the ray matrix approach for paraxial rays, the radial displacement $r$ and angular orientation $u=(dr/dz)\approx\theta$ of any ray in two displaced transverse planes, object plane 20 at $z=-f_1-d_1$ and image plane 21 at $z=f_2+d_2$, are related by the following optical transfer matrix:

$$\begin{bmatrix} r_2 \\ u_2 \end{bmatrix} =$$

$$\begin{bmatrix} 1 & d_2 \\ 0 & 1 \end{bmatrix} \begin{bmatrix} 1 & 0 \\ \frac{-1}{f_2} & 1 \end{bmatrix} \begin{bmatrix} 1 & f_1+f_2 \\ 0 & 1 \end{bmatrix} \begin{bmatrix} 1 & 0 \\ \frac{-1}{f_1} & 1 \end{bmatrix} \begin{bmatrix} 1 & d_1 \\ 0 & 1 \end{bmatrix} \begin{bmatrix} r_1 \\ u_1 \end{bmatrix} =$$

$$\begin{bmatrix} \frac{-f_2}{f_1} & f_1+f_2-\frac{f_2}{f_1}d_1-\frac{f_1}{f_2}d_2 \\ 0 & -\frac{f_1}{f_2} \end{bmatrix} \begin{bmatrix} r_1 \\ u_1 \end{bmatrix}$$

where $d_1$ is the distance from first lens 1 along the optical axis to the object plane 20, and $d_2$ is the distance of second lens 5 along the optical axis to the image plane 21. Note that the lower left hand matrix element does not need to be zero, but a nonzero element appearing there indicates that the laser beam is not fully collimated.

If one chooses $d_1$ and $d_2$ so that $$f_1+f_2-\frac{f_2}{f_1}d_1-\frac{f_1}{f_2}d_2=0,$$

$$d_1, d_2 \geq 0,$$

then image plane 21 is merely an inverted geometrical image plane of object plane 20 with a magnification $M=f_2/f_1$. The effect, apart from an adjustable magnification, is to translate (and invert) the entire ray distribution at object plane 20 to image plane 21. An analysis to determine diffraction and other phase effects in the FIG. 4 optical system shows that the phase is the same in the object plane 20 and image plane 21. An arbitrary complex wave form is merely inverted and magnified in going from object plane 20 to image plane 21. For the phase calculation and more detail on the optical relay in general, please see U.S. patent application Ser. No. 830,972 (now U.S. Pat. No. 4,158,176) filed Sept. 6, 1977, by John T. Hunt et al., and assigned to the assignee of this application, and which is hereby incorporated by reference. For the ray matrix and phase calculation methods, one standard reference is Amnon Yariv, *Introduction to Optical Electronics*, Holt, Rinehart, and Winston, Inc., New York (1971), especially chapters 2 and 3.

Figure 5:
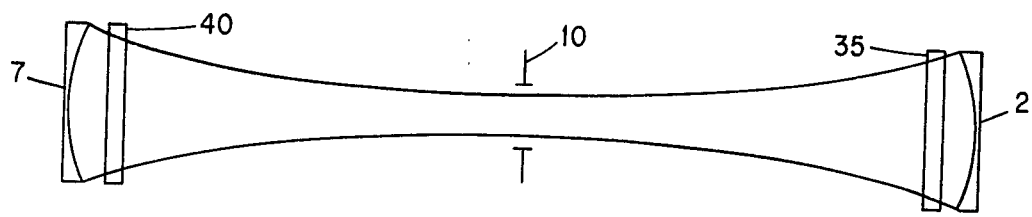
FIG. 5 is a schematic of a fully relayed regenerative amplifier with two focusing mirrors spaced to form a concentric resonator.

The application of the optical relay to a large aperture regenerative laser is the heart of this invention and such an application has great significance if optical components in the laser beam are segmented transversely. Illumination of the segment boundaries can damage the segment boundaries and give rise to strong diffraction effects which can spatially modulate the laser beam with resulting damage to optical surfaces. Largest lasers presently available have 20 cm apertures with future designs for apertures in the 30-45 cm range. With segmentation of amplifier and other laser system components, large lasers with apertures of well over 100 cm can be constructed. While use of the optical relay with a spatial filter is not limited to large regenerative amplifiers, the application of the optical relay is an especially important innovation toward the successful operation of laser systems with apertures in excess of 20 cm. The optical relay will greatly aid the operation of possible extremely large aperture lasers of the future. Lasers employing segmented optical elements are disclosed in U.S. patent application Ser. No. 868,644 (now U.S. Pat. No. 4,191,928) by John Emmett, filed on the same day as this application and assigned to the assignee of the application. This copending application by John Emmett (now U.S. Pat. No. 4,191,928) is hereby incorporated by reference. FIG. 5 is a schematic illustration of the Emmett concept. The first focusing element is a first spherical mirror 2 and the second focusing element is a second spherical mirror 7, spaced apart to form a concentric resonator. This special case of the concentric resonator is the only fully relayed, stable resonator made up of two identical mirrors. The segmented switch 35 and the segmented amplifier 40 each lie in the laser beam close to a spherical mirror. The spatial filter 10 lies at the narrowest part of the laser beam within the concentric resonator.

Multiple excitation of the laser medium of a regenerative amplifier provides greater energy deposition from the laser medium to the laser beam. A multiple excitation regenerative amplifier is disclosed in U.S. patent application Ser. No. 868,639 (now U.S. Pat. No. 4,205,278) by Victor George et al., filed on the same day as this application and assigned to the assignee of this application. This copending application by Victor George et al., Ser. No. 868,644 is hereby incorporated by reference. Multiply excited amplifiers are expected to become attractive large aperture laser systems, using the concepts disclosed in the Emmett application and the present application.

Figure 6:
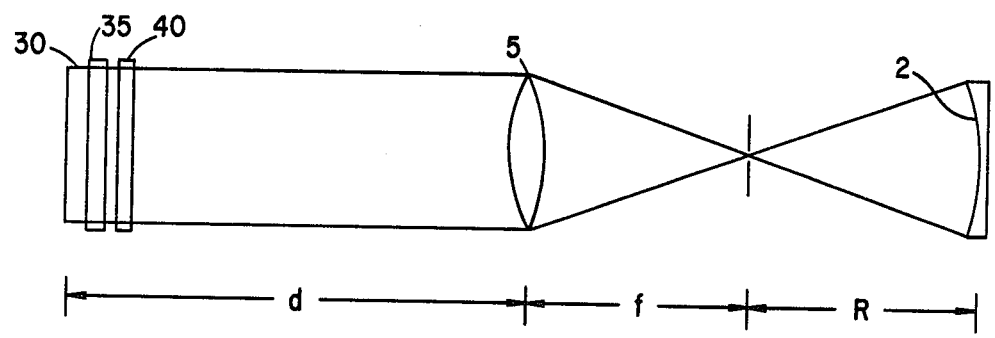
FIG. 6 is a schematic of a fully relayed regenerative amplifier with a spherical mirror and a lens as the focusing elements in a linear configuration.

FIG. 6 is a schematic view of a preferred embodiment of this invention. The first focusing means is spherical mirror 2. The second focusing means is a lens 5 located with its optical axis collinear with the spherical mirror 2 optical axis. The focusing means are spaced apart by a distance which is the sum of the focal length of the lens 5 and the radius of curvature of the spherical mirror 2. The spatial filter 10 is located with its pinhole in the common focal plane of the common focal region of the lens 5 and spherical mirror 2. The reflective means for closing the optical path is a plane mirror 30 situated in a plane perpendicular to and along the optical axis of the lens 5 at a distance equal to but opposite in direction from the separation of the lens 5 and spherical mirror 2. The switch means 35 and amplifier means 40 are similarly situated along and centered on the lens 5 optical axis between the lens 5 and plane mirror 30. If either the amplifier means 40 or the switch means 35 is segmented, the segmented component is positioned as close to the plane mirror 30 as possible in order that there not by any significant optical path difference between the passage of the laser beam through the segmented element in one direction and in the reverse direction. Reimaging takes place only once in a complete round trip of the optical path; therefore, in one pass the segmented component will not be reimaged fully while in the reverse direction it is. Thus, the operation of this embodiment proceeds by switching a seed pulse into the optical path. The pulse then moves back and forth through the optical elements, reflecting at the plane mirror 30 and spherical mirror 2. When the pulse has been amplified sufficiently it is switched out.

Figure 7:
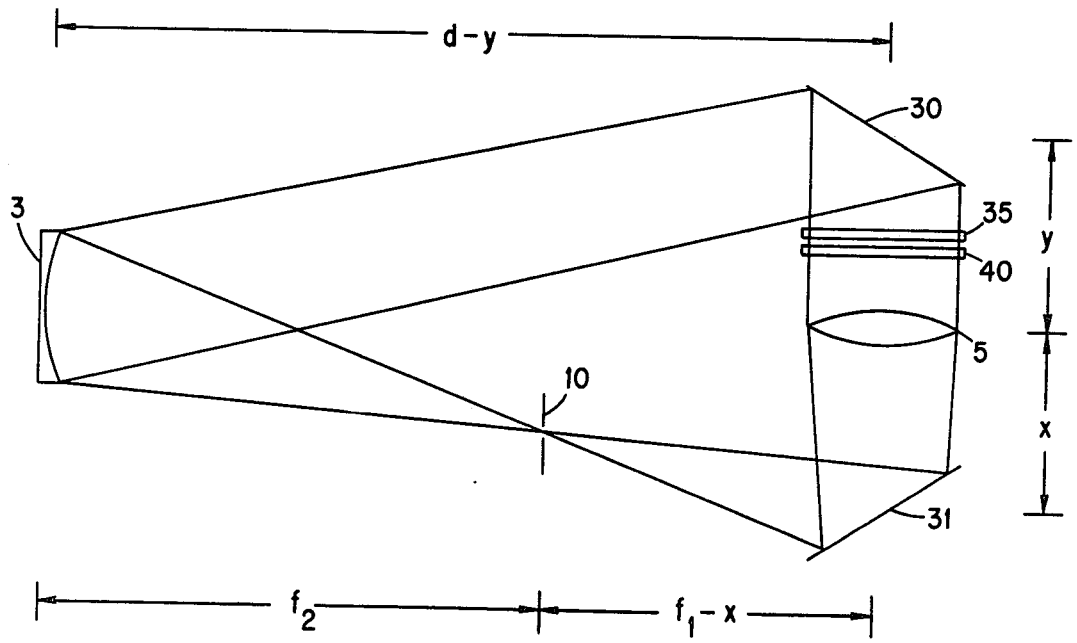
FIG. 7 is a schematic of a fully relayed regenerative amplifier with a ring configuration using a focusing mirror and a lens as focusing elements.

FIG. 7 is a schematic view of a ring configuration for the first alternate preferred embodiment. The first focusing means is a focusing mirror 3. The focusing mirror may be an off axis paraboloid, or if the f number is large it may be a spherical mirror. The second focusing means is a lens 5 situated in a plane roughly perpendicular to the plane of the focusing mirror 3. A first and second reflective means for closing the optical path are, respectively, a first flat mirror 30 on the substantially parallel light side of the lens 5 and a second flat mirror 31 on the focusing side of lens 5. The lens 5, first flat mirror 30 and second flat mirror 31 are situated to provide the same optical path length in either direction between the focusing mirror 3 and lens 5. The optical path between the focusing mirror 3 and lens 5 is twice the focal length of the lens. The focusing mirror 3 has the same focal length. Thus, the optical relay is formed with the two focusing means having a common focus, about which a spatial filter 10 is positioned. The switch means 35 and amplifier means 40 are located in the substantially parallel light portion of the optical path. Each point in this ring images upon itself; thus, the placement of segmented elements is not critical. In operation, a seed pulse is switched into the optical path by switch means 35. The pulse propagates through the optical path without changing direction. When the pulse has been amplified sufficiently, it is switched out of the closed ring that the optical path forms. Counter propagating pulses are possible.

Figure 8:
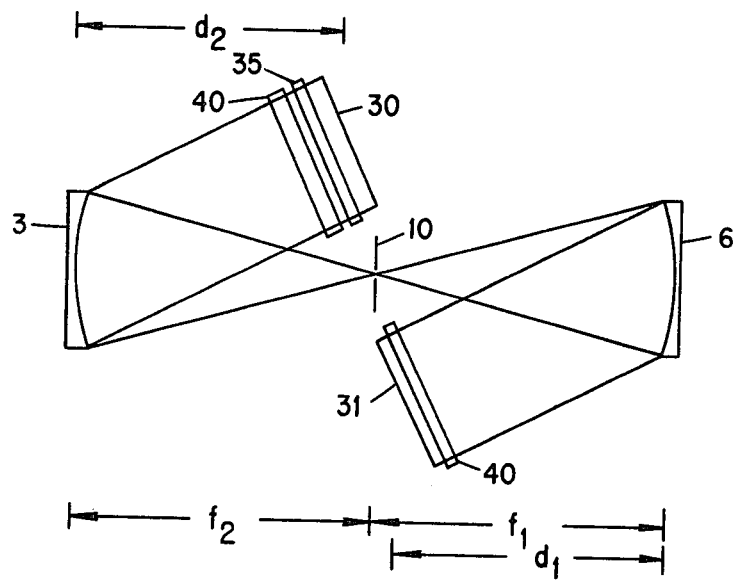
FIG. 8 is a schematic of a fully relayed regenerative amplifier with two focusing mirrors in a nonlinear configuration.

FIG. 8 is a schematic view of a second alternate preferred embodiment. The first focusing means is a first focusing mirror 3. The second focusing means is a second focusing mirror 6 situated with a collinear optical axis with the first focusing mirror 3 and spaced apart such that both focusing elements have a common focal point along their common optical axis. The focal lengths are the same. Either focusing mirror may be an off axis paraboloid, or if the f number is large may be a spherical mirror. The first and second reflective means are respectively, a first plane mirror 30 located a focal length away from the first focusing mirror 3 in the substantially parallel light portion of the optical path and a second plane mirror 31 located a focal length away from the second focusing mirror 6 in the substantially parallel light portion of the optical path. A spatial filter 10 is located at the common focal point of both focusing means. The switch means 35 and the amplifier means 40 are each located in one of the substantially parallel light portions of the optical path. If either the amplifier means 40 or the switch means 35 is segmented, each is positioned as close to a plane mirror as possible in order that there not be any significant optical path difference between the passage of the laser beam through the segmented element in one direction and in the reverse direction. In operation, a seed pulse is switched into the optical path by switch means 35. The pulse propagates through the optical system, changing direction at the first and second plane mirrors. When the pulse has been amplified sufficiently, it is switched out of the optical path to a point of use.

Figure 9:
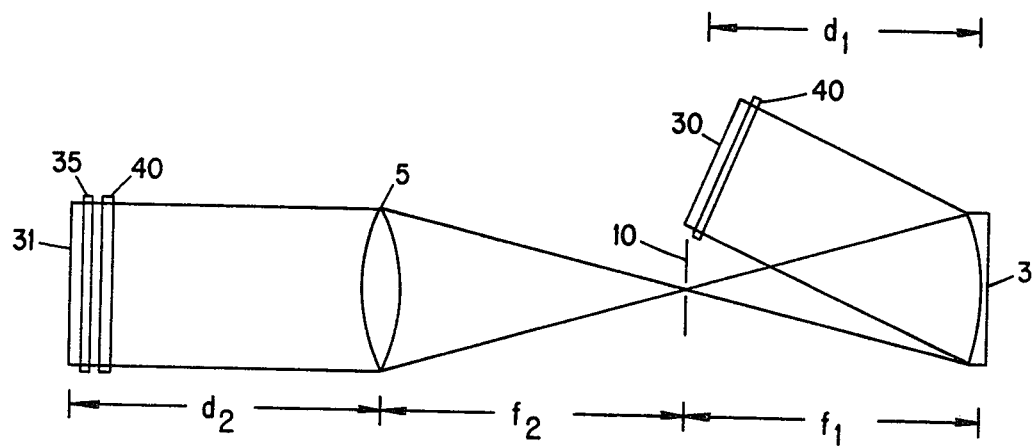
FIG. 9 is a schematic of a fully relayed regenerative amplifier with a focusing mirror and a lens as the focusing elements in a nonring and a nonlinear configuration.

FIG. 9 is a schematic view of a third alternate preferred embodiment. The first focusing means is a focusing mirror 3. The focusing mirror 3 may be an off axis paraboloid, or if the f number is large, it may be a spherical mirror. The second focusing means is a lens 5 situated such that it has a collinear optical axis with the focusing mirror 3 and is spaced apart therefrom, with these focusing means having a common focal point along their common optical axes. The focal lengths are the same. A first and second reflective means are, respectively, a first plane mirror 30, located a focal length away from the focusing mirror 3 in the substantially parallel light portion of the optical path and a second plane mirror 31, located a focal length away from the lens 5 in the substantially parallel light portion of the optical path. A spatial filter 10 is located at the focal point common to both focusing means. The switch means 35 and the amplifier means 40 are each location in one of the substantially parallel light portions of the optical path. If either the amplifier means 40 or the switch means 35 is segmented, each is positioned as close to a plane mirror as possible, in order that there not be any significant optical path difference between the passage of the laser beam through the segmented element in one direction and in the reverse direction. In operation, a seed pulse is switched into the optical path by switch means 35. The pulse propagates through the optical system, changing direction at the first and second plane mirrors. When the pulse has been amplified sufficiently, it is switched out of the optical path to a point of use.

Figure 10:
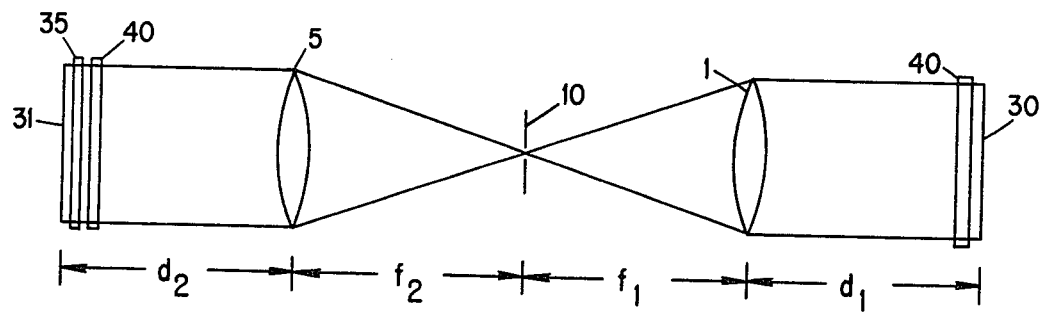
FIG. 10 is a schematic of a fully relayed regenerative amplifier with two lenses as the focusing elements.

FIG. 10 is a schematic view of a fourth alternative preferred embodiment. The first focusing means is a first lens 1. The second focusing means is a second lens 5 situated with a collinear optical axis with the first lens 1 and spaced apart such that both focusing means have a common focal point along their common optical axes. The focal lengths are the same. The first and second reflective means are, respectively, a first plane mirror 30, located a focal length away from the first lens 1 in the substantially parallel light portion of the optical path, and a second plane mirror 31, located a focal length away from the second lens in the substantially parallel light portion of the optical path. A spatial filter 10 is located about the focal region common to both focusing means. The switch means 35 and the amplifier means 40 are each located in one of the substantially parallel light portions of the optical path. If either the amplifier means 40 or the switch means 35 is segmented, each is positioned as close to a plane mirror as possible in order that there not be any significant optical path difference between the passage of the laser beam through the segmented element in one direction and in the reverse direction. In operation, a seed pulse is switched into the optical path by switch means 35. The pulse propagates through the optical system, changing direction at the first and second plane mirrors. When the pulse has been amplified sufficiently, it is switched out of the optical path to a point of use.

The optical relay embodied in this invention represents an apparatus and a method for improving the beam quality in regenerative amplifiers. Large aperture lasers, having diameters of 15 cm and more, need the optical relay for maximum performance. If optical elements are segmented, the present invention will enhance the laser operation considerably. FIGS. 6-10 include a spatial filter. Its use is optional depending on the beam quality desired.

The optical relay may be applied to regenerative amplifiers of all sizes. The optical relay places a constraint upon the placement of the optical elements in relation to one another, but there is no limitation on size, large or small, provided that the regenerative amplifier can be built for the chosen size. In the FIG. 6 embodiment, the spherical mirror 2 may have a radius of curvature of 25 meters and be one meter in diameter. Lens 5 then has a focal length of 25 meters and a diameter of one meter. The plane mirror 30 is 50 meters along the optical path from the lens 5 on the side opposite to the spherical mirror 2. The amplifier means 40 may be a segmented element of $Nd^{3+}$:glass with the switch means 35 a Pockel's cell, both as disclosed in the aforementioned patent application by John Emmett. This example is to illustrate that with the constraints recited in each embodiment in FIGS. 6 to 10, once a focal length is specified, the rest of the parameters of the laser system is known. The determine these constraints for any given regenerative amplifier system, the ray matrix analysis of Hunt et al., supra need only be followed. Table 1 shows the ray matrix analysis for the embodiments in FIGS. 6-10 including the general optical relay solution as well as the special case of $d=2f$ or $d=f$.

A fully relayed regenerative amplifier can have all of the uses of a regenerative amplifier. It may be used to attain laser fusion, communicate, find ranges, etc.

This invention has been described by way of illustration rather than limitation, and it should be apparent that it is equally applicable in fields other than those described.

TABLE I

| EMBODIMENT | RAY MATRIX | OPTICAL RELAY CONSTRAINT |
|---|---|---|
| FIG. 6 | $\begin{bmatrix} r_2 \\ u_2 \end{bmatrix} = \begin{bmatrix} 1 & d \\ 0 & 1 \end{bmatrix} \begin{bmatrix} 1 & 0 \\ -\frac{1}{f} & 1 \end{bmatrix} \begin{bmatrix} 1 & f+R \\ 0 & 1 \end{bmatrix} \begin{bmatrix} 1 & 0 \\ -\frac{2}{R} & 1 \end{bmatrix} \begin{bmatrix} 1 & f+R \\ 0 & 1 \end{bmatrix} \begin{bmatrix} 1 & 0 \\ -\frac{1}{f} & 1 \end{bmatrix} \begin{bmatrix} 1 & d \\ 0 & 1 \end{bmatrix} \begin{bmatrix} r_1 \\ u_1 \end{bmatrix}$ $= \begin{bmatrix} 1 & d-f-\frac{f^2}{R} \\ 0 & 1 \end{bmatrix}$ | $d - f - \frac{f^2}{R} = 0$ $\boxed{d = f(1 + \frac{f}{R})}$ for $R = f$ $\boxed{d = 2f}$ |

TABLE I-continued

| EMBODIMENT | RAY MATRIX | OPTICAL RELAY CONSTRAINT |
|---|---|---|
| FIG. 7 | $$\begin{bmatrix} r_2 \\ u_2 \end{bmatrix} = \begin{bmatrix} 1 & d \\ 0 & 1 \end{bmatrix} \begin{bmatrix} 1 & 0 \\ -\frac{1}{f_2} & 1 \end{bmatrix} \begin{bmatrix} 1 & f_1 + f_2 \\ 0 & 1 \end{bmatrix} \begin{bmatrix} 1 & 0 \\ -\frac{1}{f_1} & 1 \end{bmatrix} \begin{bmatrix} r_1 \\ u_1 \end{bmatrix}$$ $$= \begin{bmatrix} -\frac{f_2}{f_1} & f_1 + f_2 - \frac{f_1}{f_2} d \\ 0 & -\frac{f_1}{f_2} \end{bmatrix} \begin{bmatrix} r_1 \\ u_1 \end{bmatrix}$$ | $f_1 + f_2 - \frac{f_1}{f_2} d = 0$ $$\boxed{d = \frac{f_2}{f_1}(f_1 + f_2)}$$ for $f_1 = f_2 \equiv f$ $$\boxed{d = 2f}$$ |
| FIGS. 8–10 equivalent (see FIG. 10) | $$\begin{bmatrix} r_2 \\ u_2 \end{bmatrix} = \begin{bmatrix} 1 & d_2 \\ 0 & 1 \end{bmatrix} \begin{bmatrix} 1 & 0 \\ \frac{1}{f_2} & 1 \end{bmatrix} \begin{bmatrix} 1 & f_1 + f_2 \\ 0 & 1 \end{bmatrix} \begin{bmatrix} 1 & 0 \\ \frac{1}{f_1} & 1 \end{bmatrix} \begin{bmatrix} 1 & d_1 \\ 0 & 1 \end{bmatrix} \begin{bmatrix} r_1 \\ u_1 \end{bmatrix}$$ $$= \begin{bmatrix} -\frac{f_2}{f_1} & f_1 + f_2 - \frac{f_2}{f_1} d_1 - \frac{f_1}{f_2} d_2 \\ 0 & -\frac{f_1}{f_2} \end{bmatrix} \begin{bmatrix} r_1 \\ u_1 \end{bmatrix}$$ | $f_1 + f_2 - \frac{f_2}{f_1} d_1 - \frac{f_1}{f_2} d_2 = 0$ $$\boxed{d_2 = \frac{\frac{f_2}{f_1} d_1 - f_1 - f_2}{-\frac{f_1}{f_2}}}$$ for $f_1 = f_2 \equiv f$; $d_1 = d_2 \equiv d$ $$\boxed{d = f}$$ |

What I claim is:

1. A regenerative laser apparatus comprising:
a first focusing means for focusing laser light;
a second focusing means for focusing laser light with said first and second focusing means being spaced apart to form a common focusing region therebetween;
a first reflective means for reflecting laser light;
at least one second reflective means for reflecting laser light;
said first and second reflective means being positioned and optically aligned to form a closed optical path of aperture in excess of 20 cm. wherein laser light traversing said optical path also traverses the common focusing region;
a spatial filtering means for suppressing the effects of beam breakup, the spatial filtering means being located at the common focusing region;
optical relay means for forming an optical relay of substantially zero optical path difference by positioning and maintaining the optical alignment of the first and second focusing means and the first and second reflective means in the closed optical path whereby laser light in a regenerative amplifier can be reimaged in the optical relay;
switch means for switching laser light into and out of the closed optical path;
amplifier means for amplifying light in the closed optical path until the laser light is in excess of 4 J/cm².

2. A regenerative laser apparatus as in claim 1, wherein the first focusing means is a first focusing mirror.

3. A regenerative laser apparatus as in claim 2, wherein the second focusing means is a lens.

4. A regenerative laser apparatus as in claim 1, wherein the amplifier means is located in a substantially parallel light portion of the closed optical path.

5. A regenerative laser apparatus as in claim 1, wherein the switch means is located in a substantially parallel light portion of the closed optical path.

6. A regenerative laser apparatus as in claim 3, wherein the first focusing means is a spherical mirror spaced apart by the radius of curvature of the spherical mirror.

7. A regenerative laser apparatus as in claim 2, wherein the first focusing means is a first spherical mirror of f number ten or greater, spaced apart from the focal point of the second focusing means by the focal length of the first spherical mirror.

8. A regenerative laser apparatus as in claim 7, wherein the second focusing element is a second spherical mirror of f number ten or greater, spaced apart from the focal point of the first focusing means by the focal length of the second spherical mirror.

9. A regenerative laser apparatus as in claim 2, wherein the first focusing means is a first off-axis paraboloid.

10. A regenerative laser apparatus as in claim 9, wherein the second focusing means is a second off-axis paraboloid.

11. A regenerative laser apparatus as in claim 7, wherein the second focusing means is a lens.

12. A regenerative laser apparatus as in claim 1, wherein the amplifier means includes a gaseous laser medium.

13. A regenerative laser apparatus as in claim 1, wherein the amplifier means includes a solid state laser medium.

14. A regenerative laser apparatus as in claim 1, wherein once injected, laser light can continue to propagate in the same direction about the closed optical path until it is switched out of the closed optical path.

15. A method for producing a laser beam with a maximum fill factor in a regenerative laser, the method comprising the steps of:

forming an optical relay of substantially zero optical path difference;
forming a closed optical path of aperture in excess of 20 cm., including the optical relay, thereby creating an optical cavity;
forming a spatial filter for suppressing the effects of laser beam breakup in the optical cavity;
injecting laser light into the optical path;
amplifying the laser light until the laser light is in excess of 4 J/cm$^2$;
switching the laser light out of the optical path.

16. A method as in claim 15, wherein the optical relay is formed by a focusing mirror and a lens.

17. A method as in claim 15, wherein the optical relay is formed by two focusing mirrors.

18. A method as in claim 15, wherein the optical relay is formed by two lenses.

19. A method as in claim 16, wherein a spherical mirror is located at its radius of curvature distant from the focal point of the lens.

20. A method as in claim 15, wherein the laser light spreads in excess of 15 cm in cross section while in the optical path.

21. A method as in claim 15, further including the step of repetitively pumping the amplifier means.